(12) United States Patent
Boltz et al.

(10) Patent No.: US 10,244,894 B2
(45) Date of Patent: Apr. 2, 2019

(54) RADIANT EMBERS COOKING SYSTEM

(71) Applicant: The Boltz Group, LLC, Addison, TX (US)

(72) Inventors: Erica Boltz, Addison, TX (US); Randy May, Addison, TX (US); Bradley Gleaton, Addison, TX (US)

(73) Assignee: The Boltz Group, LLC, Addison, TX (US)

(*) Notice: Subject to any disclaimer, the term of this patent is extended or adjusted under 35 U.S.C. 154(b) by 158 days.

(21) Appl. No.: 15/444,665

(22) Filed: Feb. 28, 2017

(65) Prior Publication Data

US 2017/0248322 A1 Aug. 31, 2017

Related U.S. Application Data

(60) Provisional application No. 62/301,230, filed on Feb. 29, 2016.

(51) Int. Cl.
| | | |
|---|---|---|
| *F24C 15/00* | (2006.01) | |
| *A47J 37/07* | (2006.01) | |
| *F23D 14/14* | (2006.01) | |
| *F23D 14/76* | (2006.01) | |

(52) U.S. Cl.
CPC ....... *A47J 37/0713* (2013.01); *A47J 37/0786* (2013.01); *F23D 14/14* (2013.01); *F23D 14/76* (2013.01); *F23D 2900/14122* (2013.01)

(58) Field of Classification Search
CPC .................................................. A47J 37/0713
USPC .......................................... 126/39 B; 99/401
See application file for complete search history.

(56) References Cited

U.S. PATENT DOCUMENTS

| | | | |
|---|---|---|---|
| 3,422,811 A | * | 1/1969 | Strand ................... F23D 14/145 126/92 R |
| 4,545,291 A | * | 10/1985 | Kutsch ................. A01K 1/0058 454/365 |
| 4,885,989 A | | 12/1989 | Korpan |
| 5,473,980 A | | 12/1995 | Carpenter |
| 5,947,013 A | | 9/1999 | Stewart |
| 6,283,114 B1 | | 9/2001 | Sunbeam |
| 8,037,879 B2 | | 10/2011 | Murrin et al. |
| 2004/0025862 A1 | | 2/2004 | Lor et al. |
| 2005/0098168 A1 | | 5/2005 | Williams |
| 2009/0255414 A1 | | 10/2009 | Hudson |
| 2012/0266856 A1 | | 10/2012 | Zelek et al. |
| 2015/0223639 A1 | | 8/2015 | Winners |
| 2016/0022093 A1 | | 1/2016 | Gramola et al. |

FOREIGN PATENT DOCUMENTS

| | | |
|---|---|---|
| DE | 4236773 | 12/1999 |
| EP | 2301397 | 9/2012 |
| WO | WO-2015158408 | 10/2015 |

* cited by examiner

*Primary Examiner* — Avinash A Savani
(74) *Attorney, Agent, or Firm* — Miller & Martin PLLC

(57) ABSTRACT

A heat tent for a gas grill apparatus located between the burner and the food to shield the burners of a gas grill to protect the burners from grease drippings and food deposits, to allow additional heat to reach the food for searing and other application, to glow and provide radiant heat to optimally and evenly cook of the food while allowing the flames to be more visible so as to know that the burner is turned on even food is placed all over the tent.

20 Claims, 5 Drawing Sheets

RADIANT EMBERS COOKING SYSTEM

FIELD OF THE INVENTION

This invention pertains generally to the field of grilling appliances and, more particularly, to grilling appliances such as heat tents that produce optimum heating and even distribution of heat to the food being cooked above this part and further facilitating easy cleaning of the heat tents.

BACKGROUND OF THE INVENTION

Most gas grills contain burners that create flames to heat food. Normally, the burners are located below the food and some type of protection is normally needed between the burners and food to protect the burners from grease drippings and food deposits. Heat tents, which go by various names, e.g. flavorizer bars, is one such device commonly used to shield the burners and is located between the burner and the food. Tented burners are used in barbecue grills, however, presently available barbecue grills have several disadvantages. For example, known tented burner arrangements are ineffective in providing an optimum and even distribution of heat to the cooking surface of the grill. In addition, presently available grills shield some heat from the food and it is somewhat difficult to see if the burner is on.

Numerous innovations have been provided in prior art that are adapted to grilling appliances such as heat tents. Even though these innovations may be suitable for the specific purposes to which they address, however, they still have shortcomings. For example, related innovations provide for openings in existing heat tents to allow heat transfer, but the openings are too small to allow for even radiant heat and/or allow for grease drippings and other food debris to fall upon the heat source.

It is apparent now that numerous innovations for grilling appliances such as heat tents and method of its assembly have been developed in the prior art that are adequate for various purposes. Furthermore, even though these innovations may be suitable for the specific purposes to which they address, accordingly, they would not be suitable for the purposes of the present invention as heretofore described.

Thus there remains a need for an improved heat tent design that will produce optimum heating and even distribution of heat. Similarly, there remains a need for an improved heat tent design that will be easy to clean and easy to maintain and repair. There also remains a need to protect the heating element of grill while obtaining these other objectives.

SUMMARY OF THE INVENTION

The improved heat tent design of the present invention provides one or more heat tents that can be mounted over burners of the grilling appliances, wherein the heat tent comprises a first sloped surface and a second sloped surface, which meet along a ridge. Each of the sloped surfaces has a screen, wherein the screen is a metal net structure made from wires of stainless steel, inconel or any other suitable material.

In one embodiment, the heat tents are designed with a screen which allow additional heat to come through the screen of the heat tent to reach the food and at the same time the screen heats to the point to where they glow, providing more radiant heat for cooking, a visual indicator of heat level, and the aesthetic pleasure of seeing a fire-like heat source within a gas grill. The heat tent of existing designs is solid and the flame is almost not visible to the outside. Although some standard designs of the prior art may have small openings over the tent to achieve even cooking, these design are covered by food material that is placed over the tent to make the design inefficient and also fail to show the burner status or provide the radiant heat created by the screen.

The heat tent of the present invention has several advantages over the prior art. It provides improved heat distribution and allows for more even cooking within the grill with no cool spots.

Another advantage of the present invention is that it has the ability to have a hotter grill while providing better searing.

Another advantage of the present invention is that the design also provides the ability to see the flame and to know that the burner is turned on even when food is placed over the tent.

Another advantage of the present invention is that the screen of the tent prevents grease or other food drippings from contacting the burner, thus protecting the burner, which substantially improves the longevity of the burner.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention is directed toward a gas cooking grill 124 and, more particularly, it is directed to one or more heat tents 100 that can be mounted over burners of the grill 124, wherein the heat tents 100 of the present invention produce uniform heat applied to the food being cooked above the heat tents 100. As shown in FIGS. 1-8 an exemplary embodiment of the radiant embers cooking system comprises a grill 124 with one or more heat tents 100 with the screen 108 to provide a more radiant heat for cooking.

Figure 1:
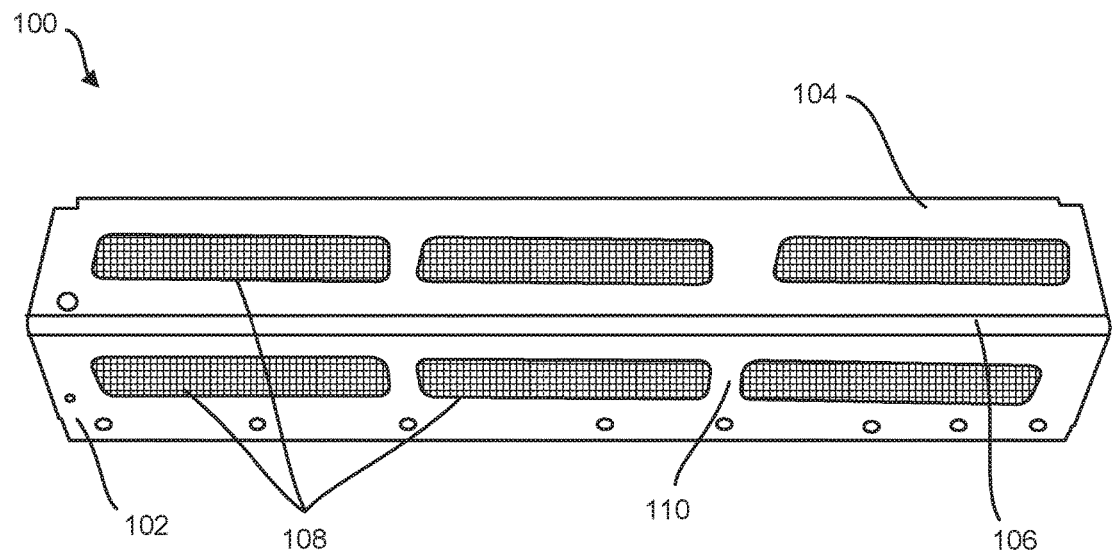
FIG. 1 is an illustration of a top perspective view of a heat tent according to an aspect of the present invention.

FIG. 1 is an illustration of a top perspective view of a heat tent 100 according to an aspect of the present invention showing a heat tent 100, which comprises a first sloped surface 102 and a second sloped surface 104, which meet along a ridge 106. In the exemplary embodiment shown, the sloped surfaces (102 and 104) are arranged with an angle of approximately 120 degrees therebetween and specifically the angle between the sloped surface is 118.7 degrees. Each of the sloped surfaces has a screen 108, wherein the screen 108 is a metal net structure made from wires of stainless steel, inconel or any other suitable material without departing from the scope and spirit of the present invention. In an embodiment, the screen 108 has a wire mesh having weave of 20 to 30 wires per inch. Further the wires of diameter 0.01 inch to 0.015 inch are generally used to prepare the wire mesh. Generally, wires of any pattern such as square or diagonal or any other pattern can be used, without departing from the scope and spirit of the present invention. In an embodiment of the invention as shown in FIG. 1 the screens 108 on the heat tent 100 are of substantially rectangular shaped and have an approximate dimension of 116 mm length and 20 mm wide and gap 110 between each screen is maintained 12 to 15 mm or less. However other size, shape and number of screens 108 on the heat tent 100 can be designed.

Figure 2:
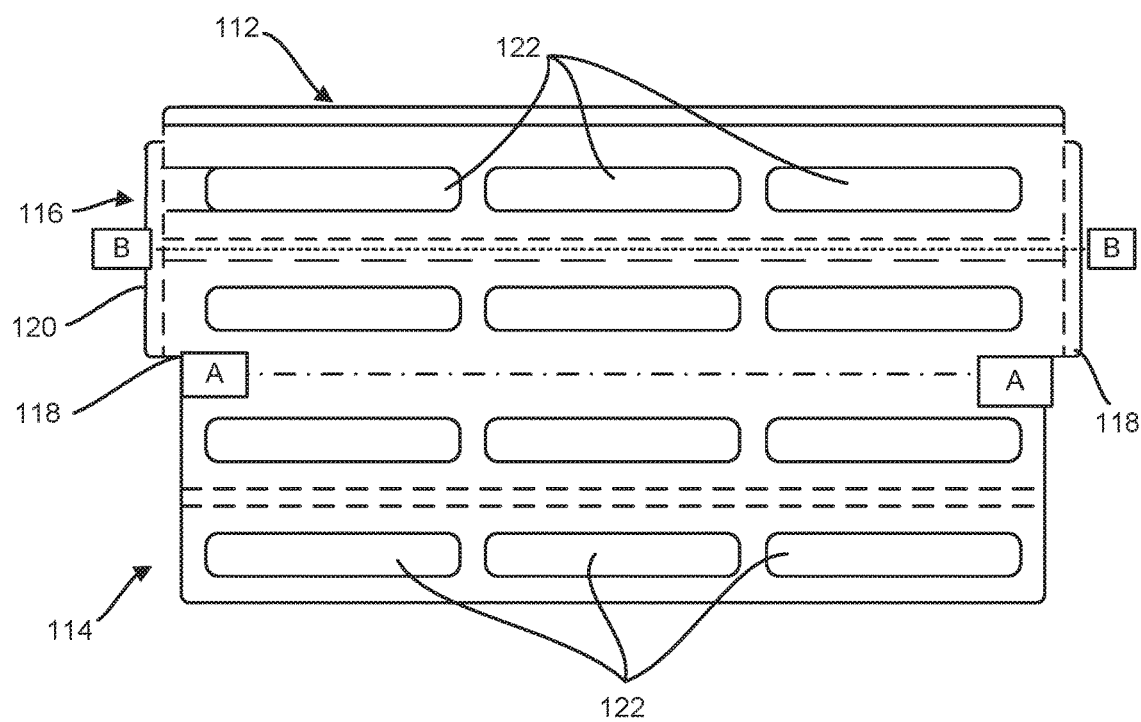
FIG. 2 is an illustration of a sheet metal design for the preparation of the heat tent according to an aspect of the present invention.

FIG. 2 shows a perspective view of a sheet 112 of metal configured for the preparation of the heat tent 100 according to an aspect of the present invention, a sheet metal of size 428 mm long and 226.4 mm wide sheet metal is cut according to the sheet 112 as shown in FIG. 2. The lower portion 114 is cut symmetrically along the length, wherein the length of the lower portion 114 is maintained at about 395 mm long in comparison to the 428 mm long upper portion 116 of the sheet 112, the longitudinally extended portions 118 along both the sides can be used as tab extensions to facilitate quick attachment and removal of the heat tent 100 from the burner such as for cleaning. The ends 120 of the tab extensions 118 are turned or folded to strengthen them as well as to avoid any sharp edges of the metal sheet. The tab extensions 118 are 8 mm long according to an example of the invention, however any size and shape of tab extensions 118 that may solve the purpose of easy, safe and quick attachment and removal of the heat tent 100 from the grill can be used without departing from the scope and spirit of the invention. Six openings 122 on lower portion 114 and another six openings 122 on the upper portion 116 of the sheet 112 are made, wherein the openings 122 on the lower portion 114 matches with the openings 122 on the upper portion 116 of the sheet when the lower portion 114 of the sheet is turned along the line A-A of the sheet 112. A wire mesh termed as a screen (not shown) is placed between the upper 116 and lower portion 114 of the sheet 112 and the lower and upper portions (114 and 116) are joined permanently by either welding or removably by nut and screws or by any other ways. Then the sheet 112 is bent to a predetermined angle of about 120 degrees along the line B-B to form a heat tent 100 having a central ridge portion 106 along the line B-B and a first sloped surface 102 and a second sloped surface 104, which meet along the ridge 106. The screens or wire mesh can be attached to the openings 122 of the tent 100 by various other suitable methods without departing from the scope and spirit of the invention.

The heat tent 100 of the present invention is made from sheet metal such as stainless steel or cold rolled steel or cold rolled steel with porcelain coating or any other material composition having appropriate properties of corrosion resistance, high melting point, high load bearing capacity and other properties that are suitable for heat tent design, without departing from the scope and spirit of the invention.

Figure 3:
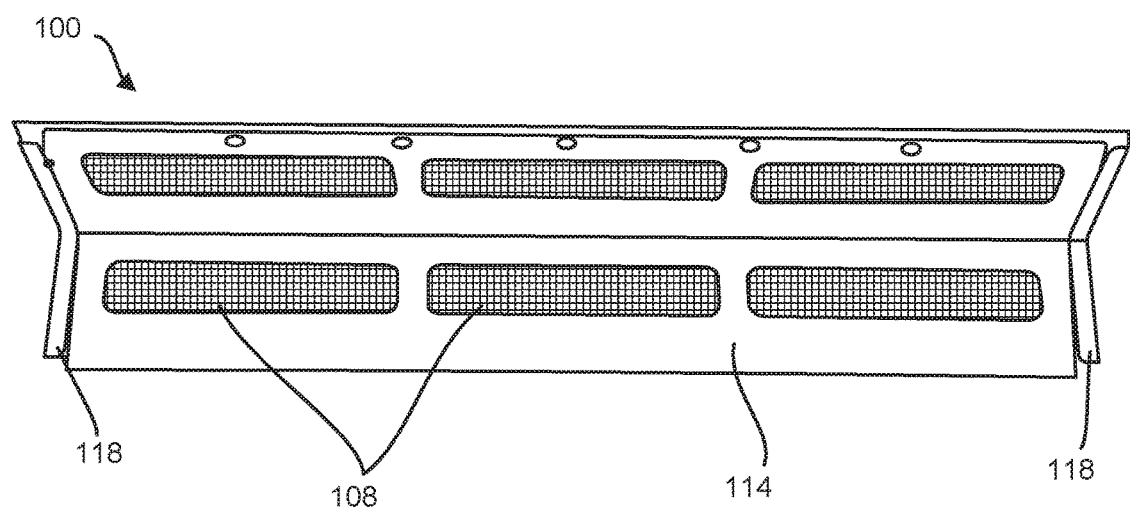
FIG. 3 is an illustration of a bottom perspective view of the heat tent according to an aspect of the present invention.

FIG. 3 is an illustration of a bottom perspective view of the heat tent 100 according to an aspect of the present invention showing the tab extensions 118, the joining of the lower portion 114 and upper portion 116 of the sheet 112 after inserting a screen 108 or wire mesh in between the portions (114 and 116) and bending at the center to form a tent like structure.

Figure 4:
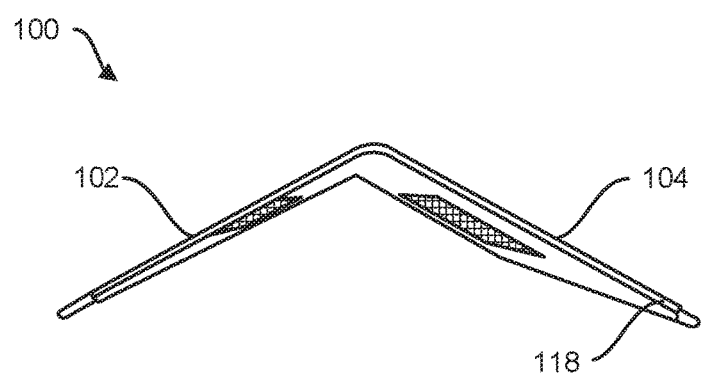
FIG. 4 is an illustration of a side view of the heat tent according to an aspect of the present invention.

FIG. 4 is an illustration of a side view of the heat tent 100 according to an aspect of the present invention showing the thickness of the sheet material at the tab extensions 118 and angle between the sloped surfaces (102 and 104) of the tent 100. In an example the sloped surfaces (102 and 104) are arranged with an angle of approximately 120 degrees there between and specifically the angle between the sloped surface is 118.7 degrees.

Figure 5:
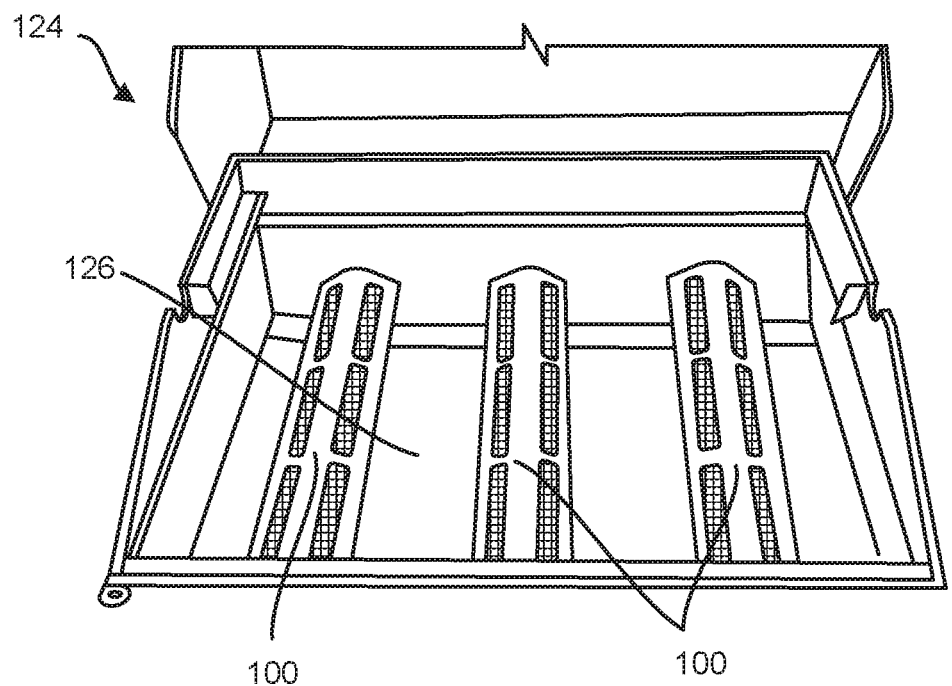
FIG. 5 is an illustration of a top perspective view of a grill having heat tents mounted over burners of the grill according to an aspect of the present invention.

FIG. 5 is an illustration of a top perspective view of a grill 124 having heat tents 100 mounted over burners of a grill 124 according to an aspect of the present invention. In an exemplary embodiment as shown in the FIG. 5 three tents 100 are arranged over burners of the grill 124, however any number of tents 100 can be arranged in a grill 124 as per the requirement without any limitation to the shape and size of the tents. The gap 126 between the tents 100 also prevents drippings and food particulates from becoming trapped between the tents 100 and also the present design promotes an even distribution of heat to the cooking surface and allows grease to drain from the cooking surface.

Figure 6:
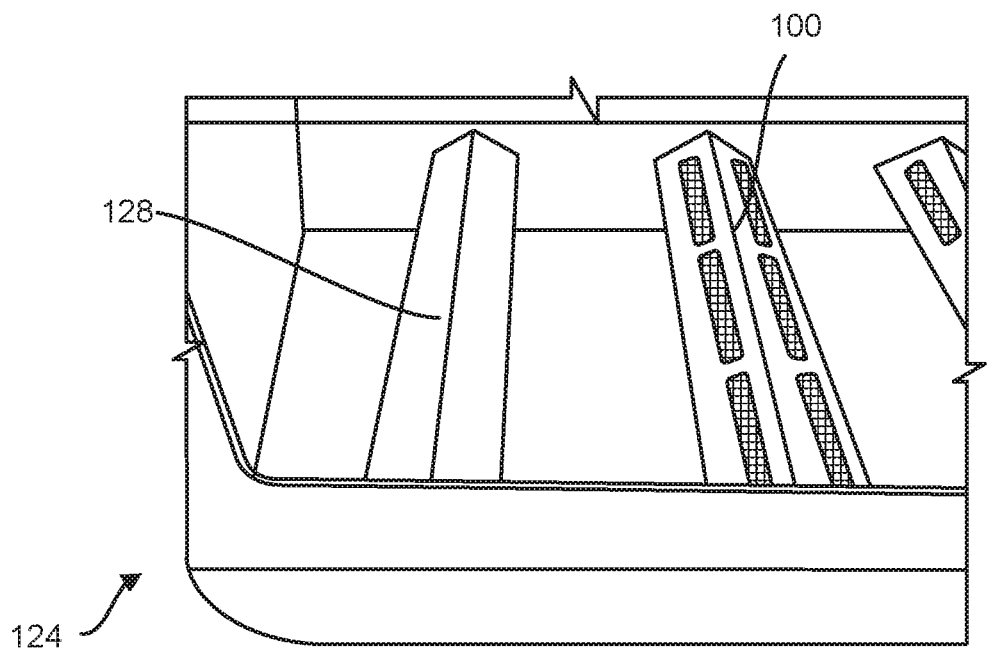
FIG. 6 is an illustration of a top perspective view of a grill showing side-by-side arrangements of a conventional heat tent and the heat tent of the present invention.

FIG. 6 is an illustration of a top perspective view of a grill 124 showing side-by-side arrangements of a conventional heat tent 128 and the heat tent 100 of the present invention.

The design of the present invention allows the flames to be more visible, so as to know that the burner is turned on even food is placed all over the tent, however it is difficult to know the burner status in the standard design 128 of the prior art as the tent 128 is solid and flame is almost not visible to the outside.

Figure 7:
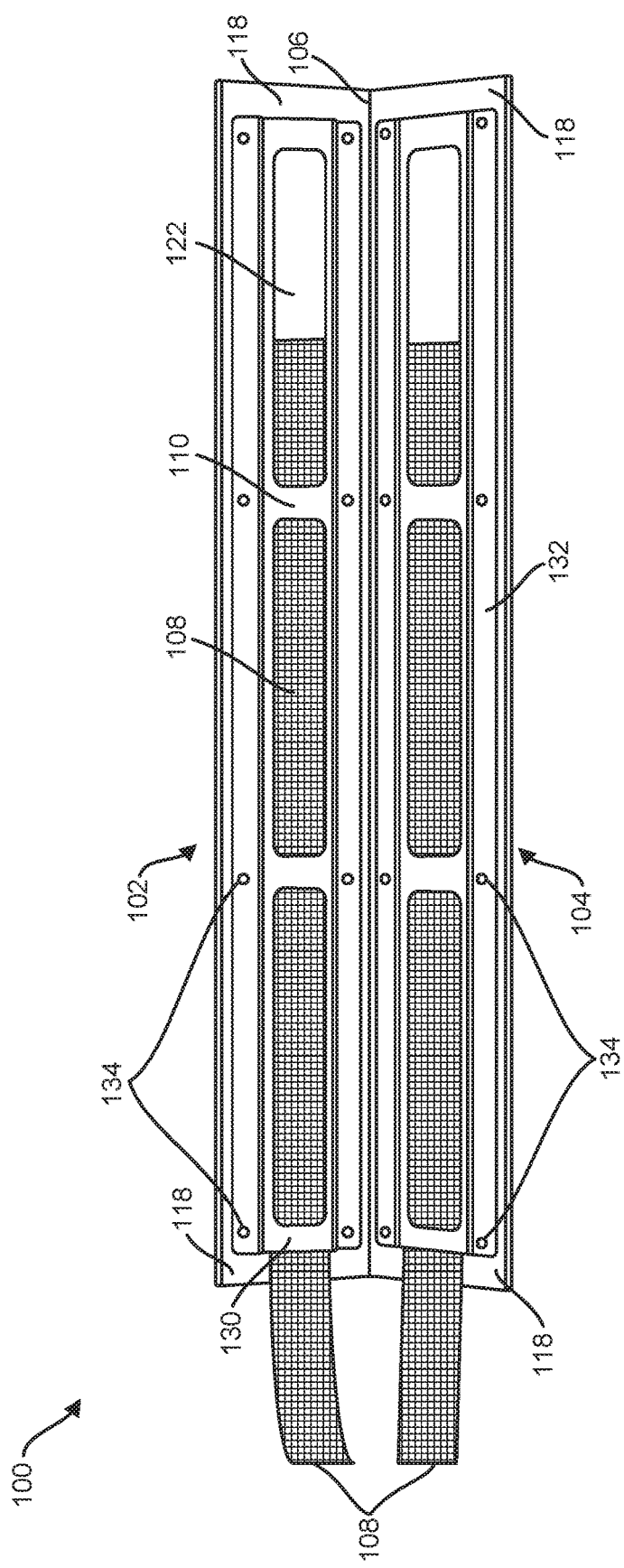
FIG. 7 showing an alternate embodiment of the invention illustrating removable insertion of the screen in to the spaces between brackets and the sloped surfaces.

FIG. 7 is an illustration of an exemplary embodiment of the invention showing, a method for making a heat tent 100 for a cooking grill 124 comprising, cutting a sheet 112 metal according to a predetermined profile; preparing a plurality of rows of openings 122 at predetermined intervals on the sheet 112; bending the sheet 112 to a predetermined angle along the central line to form a central ridge portion 106, a first sloped surface 102 and a second sloped surface 104 of the heat tent 100, wherein first sloped surface 102 and a second sloped surface 104 meet along the ridge 106; fixing a bracket 130 to the sloped surfaces (102 and 104), wherein the bracket 130 is designed to create a space (not shown) between the bracket 130 and the sloped surface (102 or 104); and removably placing a screen 108 into the space between the bracket 130 and the sloped surface (102 or 104) to cover the openings 122. The brackets 130 may have identical dimensions as the openings 122 created on the sloped surfaces (102 and 104), and further the brackets 130 are designed to create a space or pocket (not shown) between the bracket 130 and the sloped surface (102 or 104), thereby allowing removable placement of the screens 108 into the pockets. The brackets 130 are fixed to the back side of the sloped surfaces (102 or 104) by spot welding at a plurality of spots 134 along the longitudinal edges 132 of the brackets 130, however other methods of joining the longitudinal edges 132 of the brackets 130 to the sloped surfaces (102 or 104) can be used without departing from the scope and spirit of the present invention. Further any other shape and design of bracket 130 or any suitable clamps can be used for removably holding the screens 108 in place to cover the openings 122 of the sloped surfaces (102 or 104) without departing from the scope and spirit of the present invention.

Figure 8:
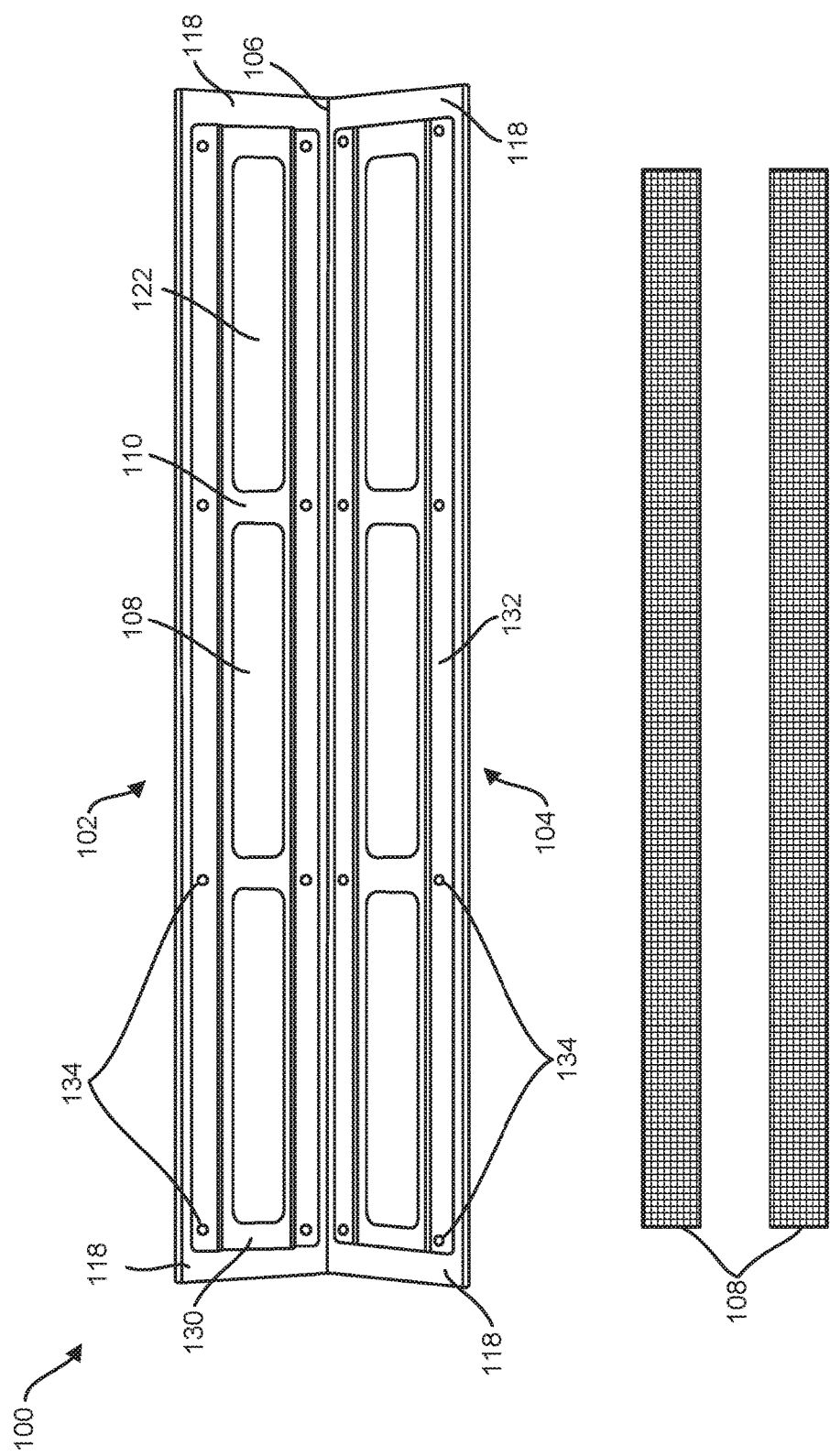
FIG. 8 illustrating, the screen removed from the spaces between the brackets and the sloped surfaces, according to the alternate embodiment of the invention.

FIG. 8 shows the screens 108 removed from the heat tent 100. Easy and quick removal of the screens 108 from the spaces between the brackets 130 and the sloped surfaces (102 or 104) facilitate easy cleaning of the heat tents 100 or replacement of the screens 108. FIG. 8 also shows the extended tab portions 118 along the longitudinal edges 132 of the heat tent 100. The tab extensions 118 are 8 mm long according to an example of the invention, however any size and shape of tab extensions 118 that may solve the purpose of easy, safe and quick attachment and removal of the heat tent 100 from the grill 124 can be used without departing from the scope and spirit of the invention. Further, according to an example the FIG. 8 shows six openings 122 designed on the heat tent 100, however any number of openings 122, without limitation to the size and shape of the openings 122 can be used without departing from the scope and spirit of the invention. Further, FIG. 8 shows the screens 108, that are used to cover the openings 122 of the heat tent 100, however an individual screen can be inserted into each of the openings 122 or a single screen can be used to cover all the openings 122 by suitably designing the bracket 130 as required without departing from the scope and spirit of the invention.

According to another embodiment of the present invention, a heat tent 100 for a grill 124 comprising, a first sloped surface 102, a second sloped surface 104 and a central ridge portion 106, wherein the first and second sloped surfaces (102 and 104) meet along the ridge 106; and one or more openings 122 on each of the sloped surfaces (102, 104), wherein the blank area on each sloped surfaces (102 or 104) comprises a holding means, such as a bracket 130, for removably holding one or more metal net structures to act as screen 108 to cover each of the openings 122.

According to an aspect of the present invention, the angle between the first sloped surface 102 and the second sloped surface 104 is approximately 120 degrees, e.g. the sloped angle may be maintained around 115 degrees to 125 degrees and more specifically the angle between the first sloped surface 102 and the second sloped surface 104 is exactly 118.7 degrees.

According to another aspect of the present invention, the screens 108 are made from stainless steel, inconel or corrosion resistant wires of diameter 0.01 inch to 0.015 inch and having weave of 20 to 30 wires per inch.

According to another aspect of the present invention, the heat tent 100 comprises three substantially rectangular shaped openings 122 on each sloped surface (102, 104) and each blank 122 has an approximate dimension of 116 mm length and 20 mm wide, further space between two openings 122 is 15 mm or less.

According to another aspect of the present invention, the heat tent 100 is made from sheet metal such as stainless steel or cold rolled steel or cold rolled steel with porcelain coating or any other material composition having property of corrosion resistant, high melting point and high load bearing capacity and other properties that are suitable for cooking grill applications.

According to another aspect of the present invention, the holding means comprising a bracket 130 fixed to the sloped surfaces (102, 104), either on the backside or topside, thereby allowing removable placement of a wire mesh structure 108 between the bracket 130 and the sloped surface (102, 104) to cover the openings 122.

According to another aspect of the present invention, the edges of the openings 122 slightly bulge outward from the surface of the sloped surfaces (102 and 104) so as to allow dropped food particulates to pass over the space between the screens 110 and prevent the screens 108 form food particulates blockage According to another embodiment of the present invention, a method for making a heat tent 100 for a cooking grill 124 comprising, cutting a sheet 112 of metal according to a predetermined profile, having a lower portion 114 and an upper portion 116; preparing a plurality of rows of symmetrical rectangular openings 122 at predetermined intervals on the lower portion 114 and the upper portion 114 of the sheet 112; folding the lower portion 114 of the sheet along the central line of the sheet 112 to match the openings 122 on the lower portion 114 with the openings 122 on the upper portion 116 of the sheet; removably placing one or more screens 108 in between the upper and lower portion of the sheet to cover the openings; joining the edges of the lower and the upper portions (114 and 116) of the sheet permanently to form a folded sheet; and bending the folded sheet to a predetermined angle along the central line to form a central ridge portion 106, a first sloped surface 102 and a second sloped surface 104 of the heat tent 100, wherein the first sloped surface 102 and the second sloped surface 104 meet along the ridge 106.

According to another aspect of the present invention, the heat tent 100 is made of sheet metal of size 428 mm long and 226.4 mm wide and is cut according to a predetermined profile 112.

According to another aspect of the present invention, the profile of the sheet metal 112 comprising a 395 mm long lower portion 114 and a 428 mm long upper portion 116, wherein the upper portion 116 being longer than the lower portion 114 equally extend along both the longitudinal edges to form tab extensions 118 of the heat tent, wherein the tab extensions 118 are 8 mm long.

According to another aspect of the present invention, the longitudinal edges of the lower and upper portions (114 and 116) are joined permanently by welding.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A method for making a heat tent for a cooking grill comprising a burner, the method comprising:
   a. cutting a sheet metal according to a predetermined profile;
   b. preparing a plurality of openings at predetermined intervals on the sheet metal;
   c. bending the sheet to a predetermined angle along the central line to form a central ridge portion, a first sloped surface and a second sloped surface of the heat tent, wherein first sloped surface and a second sloped surface meet along the ridge;
   e. fixing a bracket to the sloped surfaces, wherein the bracket is designed to create a space between the bracket and the sloped surface; and
   f. removably placing a screen into the space between the bracket and the sloped surface to cover the openings, the screen for protecting the burner from grease or other food drippings.

2. The method of making a heat tent of claim 1, wherein the angle between the first sloped surface and the second sloped surface is approximately 120 degrees.

3. The method of making a heat tent of claim 1, wherein the screens are made from stainless steel, inconel or corrosion resistant wires of diameter 0.01 inch to 0.015 inch and having weave of 20 to 30 wires per inch.

4. The method of making a heat tent of claim 1, wherein the heat tent comprises three substantially rectangular shaped openings on each sloped surface and each blank has an approximate dimension of 116 mm length and 20 mm wide, further space between two openings is 15 mm or less.

5. The method of making a heat tent of claim 1, wherein the heat tent is made from sheet metal such as stainless steel or cold rolled steel or cold rolled steel with porcelain coating or any other material composition having properties from a group consisting of corrosion resistance, high melting point, and high load bearing capacity.

6. The method of making a heat tent of claim 1, wherein the brackets are fixed by welding to the first sloped surface and the second sloped surface of the heat tent.

7. The method of making a heat tent of claim 1, wherein the edges of the openings slightly bulge outward as to allow dropped food particulates to pass over the space between the screens.

8. A method for making a heat tent for a cooking grill comprising a burner, the method comprising:

a. cutting a sheet metal according to a predetermined profile, having a lower portion and an upper portion;
b. preparing plurality rows of symmetrical rectangular openings at predetermined intervals on the lower portion and the upper portion of the sheet;
c. folding the lower portion of the sheet along the central line of the sheet to match the openings on the lower portion with the openings on the upper portion of the sheet;
d. removably placing one or more screens in between the upper and lower portion of the sheet to cover the openings, the screens for protecting the burner from grease or other food drippings;
e. joining the edges of the lower and the upper portions of the sheet permanently to form a folded sheet; and
f. bending the folded sheet to a predetermined angle along the central line to form a central ridge portion, a first sloped surface and a second sloped surface of the heat tent, wherein the first sloped surface and the second sloped surface meet along the ridge.

9. The method of making a heat tent of claim 8, wherein the angle between the first sloped surface and the second sloped surface is 118.7 degrees.

10. The method of making a heat tent of claim 8, wherein the heat tent is made of sheet metal of size 428 mm long and 226.4 mm wide and is cut according to a predetermined profile.

11. The method of making a heat tent of claim 8, wherein the profile of the sheet metal comprising a 395 mm long lower portion and a 428 mm long upper portion.

12. The method of making a heat tent of claim 8, wherein the longitudinal edges of the lower and upper portions are joined permanently by welding.

13. The method of making a heat tent of claim 8, wherein the upper portion being longer than the lower portion equally extend along both the longitudinal edges to form tab extensions of the heat tent, wherein the tab extensions are 8 mm long.

14. A heat tent for a cooking grill comprising a burner, the heat tent comprising:
a. a first sloped surface, a second sloped surface, and a central ridge portion, wherein the first and second sloped surfaces meet along the central ridge portion;
b. one or more openings defining one or more blank areas on each of the sloped surfaces; and
c. one or more screens disposed within the one or more blank areas, wherein each blank area on each sloped surface comprises a holding means for removably holding the one or more screens within each of the openings, the screens for protecting the burner from grease or other food drippings.

15. The heat tent of claim 14, wherein the angle between the sloped surfaces is between 115 degrees to 125 degrees.

16. The heat tent of claim 14, wherein the screens are made from stainless steel, inconel or corrosion resistant wires of diameter 0.01 inch to 0.015 inch and having weave of 20 to 30 wires per inch.

17. The heat tent of claim 14, wherein the screens on the heat tent are substantially rectangular shaped and has an approximate dimension of 116 mm length and 20 mm wide, further space between each screen is 15 mm or less.

18. The heat tent of claim 14, wherein the heat tent is made from sheet metal such as stainless steel or cold rolled steel or cold rolled steel with porcelain coating or any other material composition having property of corrosion resistant, high melting point and high load bearing capacity and other properties that are suitable for cooking grill applications.

19. The heat tent of claim 14, wherein the holding means comprising a bracket fixed to each of the sloped surfaces, thereby allowing removable placement of a screen between the bracket and the sloped surface to cover the openings.

20. The heat tent of claim 14, wherein the edges of the openings slightly bulge outward as to allow dropped food particulates to pass over the space between the screens.

* * * * *